US011950225B2

(12) United States Patent
Lei et al.

(10) Patent No.: US 11,950,225 B2
(45) Date of Patent: Apr. 2, 2024

(54) SELECTIVE CHANNEL STATE MEASUREMENT AND REPORT FOR SMALL DATA TRANSFER IN POWER SAVING MODE

(71) Applicant: QUALCOMM Incorporated, San Diego, CA (US)

(72) Inventors: Jing Lei, San Diego, CA (US); Huilin Xu, Temecula, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/308,510

(22) Filed: May 5, 2021

(65) Prior Publication Data

US 2021/0352692 A1 Nov. 11, 2021

Related U.S. Application Data

(60) Provisional application No. 63/021,624, filed on May 7, 2020.

(51) Int. Cl.

| H04W 72/1268 | (2023.01) |
| H04L 5/00 | (2006.01) |
| H04W 52/02 | (2009.01) |
| H04W 74/08 | (2009.01) |
| H04W 74/0833 | (2024.01) |
| H04W 76/28 | (2018.01) |

(52) U.S. Cl.
CPC ....... *H04W 72/1268* (2013.01); *H04L 5/0057* (2013.01); *H04W 52/0235* (2013.01); *H04W 74/0833* (2013.01); *H04W 76/28* (2018.02)

(58) Field of Classification Search
CPC ............. H04W 72/1268; H04W 76/28; H04W 52/0235; H04W 74/0833; H04L 5/0057
See application file for complete search history.

(56) References Cited

U.S. PATENT DOCUMENTS

| 2019/0363843 A1* | 11/2019 | Gordaychik .............. H04L 1/08 |
| 2020/0107369 A1 | 4/2020 | Jeon et al. |
| 2021/0022143 A1* | 1/2021 | Xiong ................... H04W 76/27 |

FOREIGN PATENT DOCUMENTS

| EP | 3716723 A1 | 9/2020 |
| WO | 2019084570 A1 | 5/2019 |

OTHER PUBLICATIONS

International Search Report and Written Opinion—PCT/US2021/031157—ISA/EPO—dated Sep. 1, 2021.

* cited by examiner

*Primary Examiner* — Ricky Q Ngo
*Assistant Examiner* — Stephen N Steiner
(74) *Attorney, Agent, or Firm* — Loza & Loza LLP

(57) ABSTRACT

A user equipment (UE) may initiate a Type-1 or Type-2 random access procedure from a power saving mode, generate a channel state information (CSI) report and a buffer status report, and selectively multiplex the CSI report and BSR with mobile originated (MO) data in a random-access message of the random-access procedure. The UE may further transmit a request to remain in the power saving mode after finishing the transmission of the MO data. The configuration of random access and CSI reporting procedure depends on the UE type or UE capability supported by the network.

30 Claims, 14 Drawing Sheets

SELECTIVE CHANNEL STATE MEASUREMENT AND REPORT FOR SMALL DATA TRANSFER IN POWER SAVING MODE

RELATED APPLICATIONS

This application claims priority to provisional U.S. App. No. 63/021,624, filed on May 7, 2020 to Lei et al, titled "Selective Channel State Measurement and Report for Small Data Transfer in Power Saving Mode," the contents of which is incorporated by reference in its entirety herein.

TECHNICAL FIELD

The technology discussed below relates generally to wireless communication networks, and more particularly, to techniques for providing channel state information in random-access messages.

INTRODUCTION

In wireless communication systems, such as those specified under standards for 5G New Radio (NR), an access point (e.g., a base station) may communicate with a user equipment (UE) (e.g., a smartphone). The communication can utilize a modulation and coding scheme (MCS), rank, and precoding matrix selected based on an estimate of the channel between the base station (BS) and the UE. To assist the UE in estimating the channel, the base station may transmit one or more reference signals, such as channel state information-reference signals (CSI-RS), to the UE. After channel estimation, the UE may return a channel state information (CSI) report indicating the quality of the channel to the base station. The CSI may include, for example, a channel quality indicator (CQI) that indicates to the base station an MCS to use for downlink transmissions to the UE, a rank indicator (RI) that indicates to the base station the rank to use for transmissions to the UE, a precoding matrix indicator (PMI) that indicates to the base station the precoding matrix to use for transmissions to the UE, and other suitable parameters.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method is disclosed for wireless communication of a scheduled entity in a wireless communication network. The method may include initiating a random-access procedure to transmit mobile originated (MO) uplink (UL) data from the scheduled entity in a power saving mode of the scheduled entity and generating a channel state information (CSI) report and a buffer status report (BSR). The method may further include transmitting the channel state information report and the buffer status report to a scheduling entity in a random-access message of the random access procedure, receiving a random-access response message from the scheduling entity in response to transmitting the channel state information report and the buffer status report in the random-access message, and transmitting the MO UL data to the scheduling entity while remaining in the power saving mode, based on the received random-access response message.

In some examples, a user equipment (UE) is provided within a wireless communication network, that includes a transceiver, a memory, and a processor communicatively coupled to the transceiver and the memory, wherein the processor and the memory are configured to initiate a random access procedure to transmit MO UL data from the scheduled entity in a power saving mode of the scheduled entity, generate a CSI report and a BSR, transmit the channel state information report and the buffer status report to a scheduling entity in a random-access message of the random access procedure, receive a random-access response message from the scheduling entity in response to transmitting the channel state information report and the buffer status report in the random-access message, and transmit the MO UL data to the scheduling entity while remaining in the power saving mode, based on the received random-access response message.

In some examples, a method is disclosed for wireless communication of a base station (BS) in a wireless communication network, the method including receiving channel state information report and buffer status report from a user equipment (UE) operating in a power saving mode, receiving a request from the UE to remain in the power saving mode, transmitting an uplink grant in a random-access response message in response to receiving the random-access message including UE's channel state information report and the buffer status data, transmitting an acknowledgement multiplexed with an uplink grant in the DCI or in the random-access response message to allow the UE to remain in the power saving mode, transmitting a CSI request for refined or compressed CSI report in the DCI or in the random-access response message, and receiving MO data in response to transmitting the uplink grant.

In some examples, a scheduling entity is disclosed within a wireless communication network, that includes a transceiver, a memory, and a processor communicatively coupled to the transceiver and the memory, wherein the processor and the memory are configured to receive channel state information report and buffer status report from a UE operating in a power saving mode, receive a request from the UE to remain in the power saving mode, transmit an uplink grant in a random-access response message in response to receiving the random-access message including UE's channel state information report and the buffer status data, transmit an acknowledgement multiplexed with an uplink grant in the CSI or in the random-access response message to allow the UE to remain in the power saving mode, transmit a CSI request for refined or compressed CSI report in the DCI or in the random-access response message, and receive mobile originated (MO) data in response to transmitting the uplink grant. These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

Figure 1:
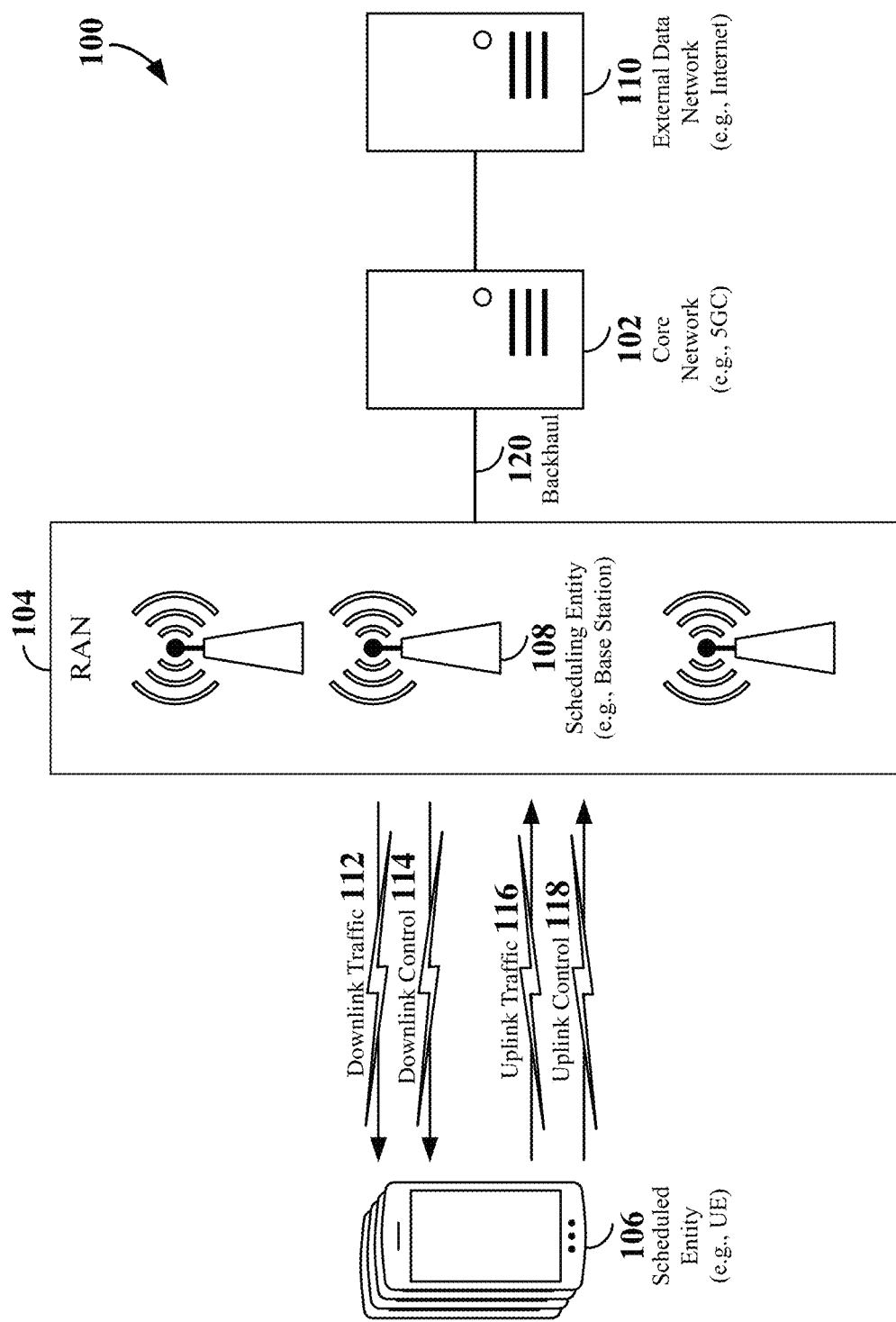
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to CSI measurement reporting from a UE to a base station. In NR light (New Radio-light) for a lower-cost wireless link, link adaptation of the Physical Downlink Control Channel (PDCCH) and Physical Downlink Shared Channel (PDSCH) is useful for enhancing the coverage and spectral efficiency of the wireless link. An aperiodic and compressed Channel Quality Indicator/Channel State Information (CQI/CSI) report can be transmitted in a Physical Uplink Shared Channel (PUSCH), Physical Uplink Control Channel (PUCCH), or Uplink Control Information (UCI) piggybacked on a PUSCH. This early reporting enhances the wireless link sooner and with less overhead.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
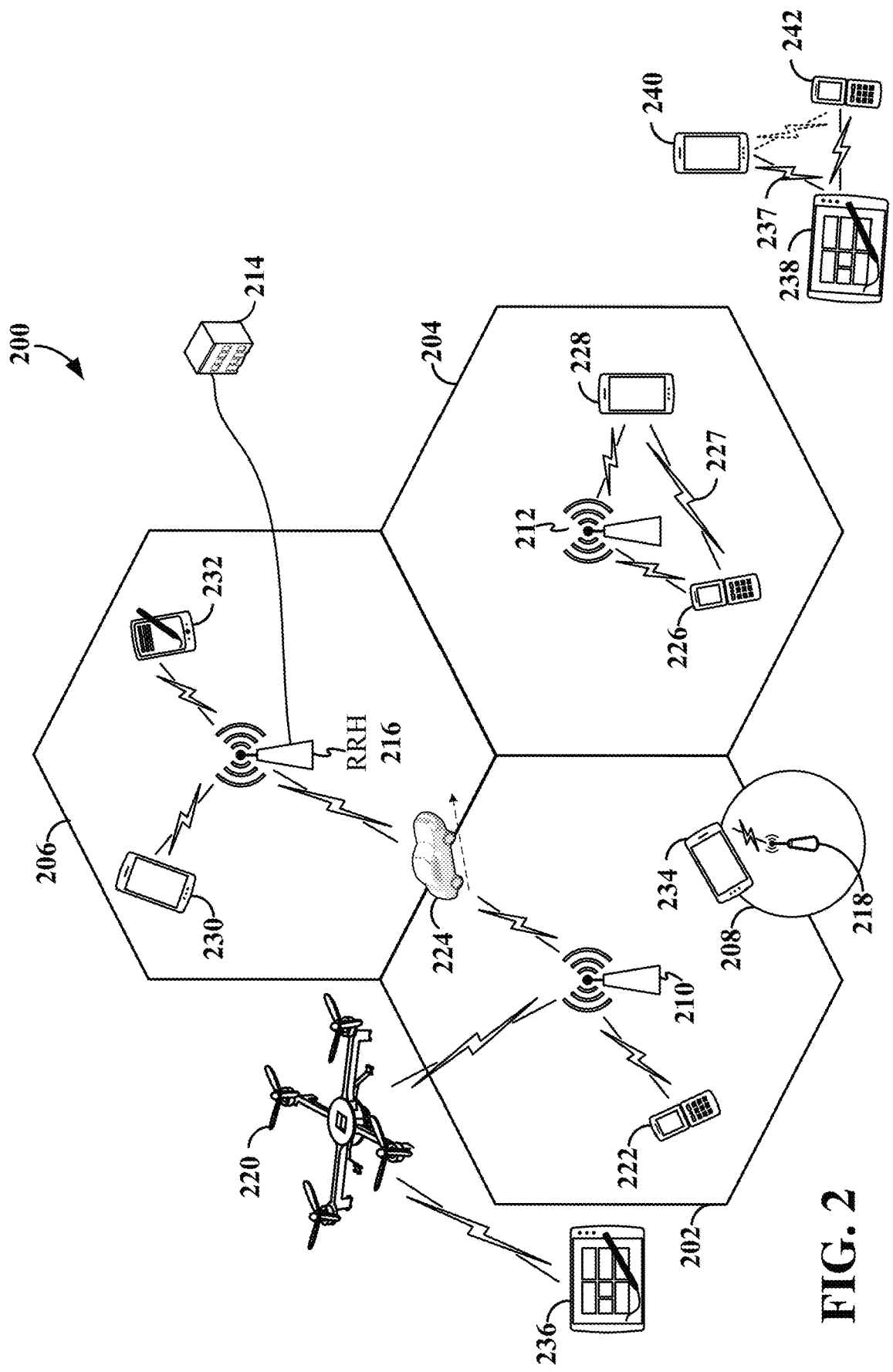
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
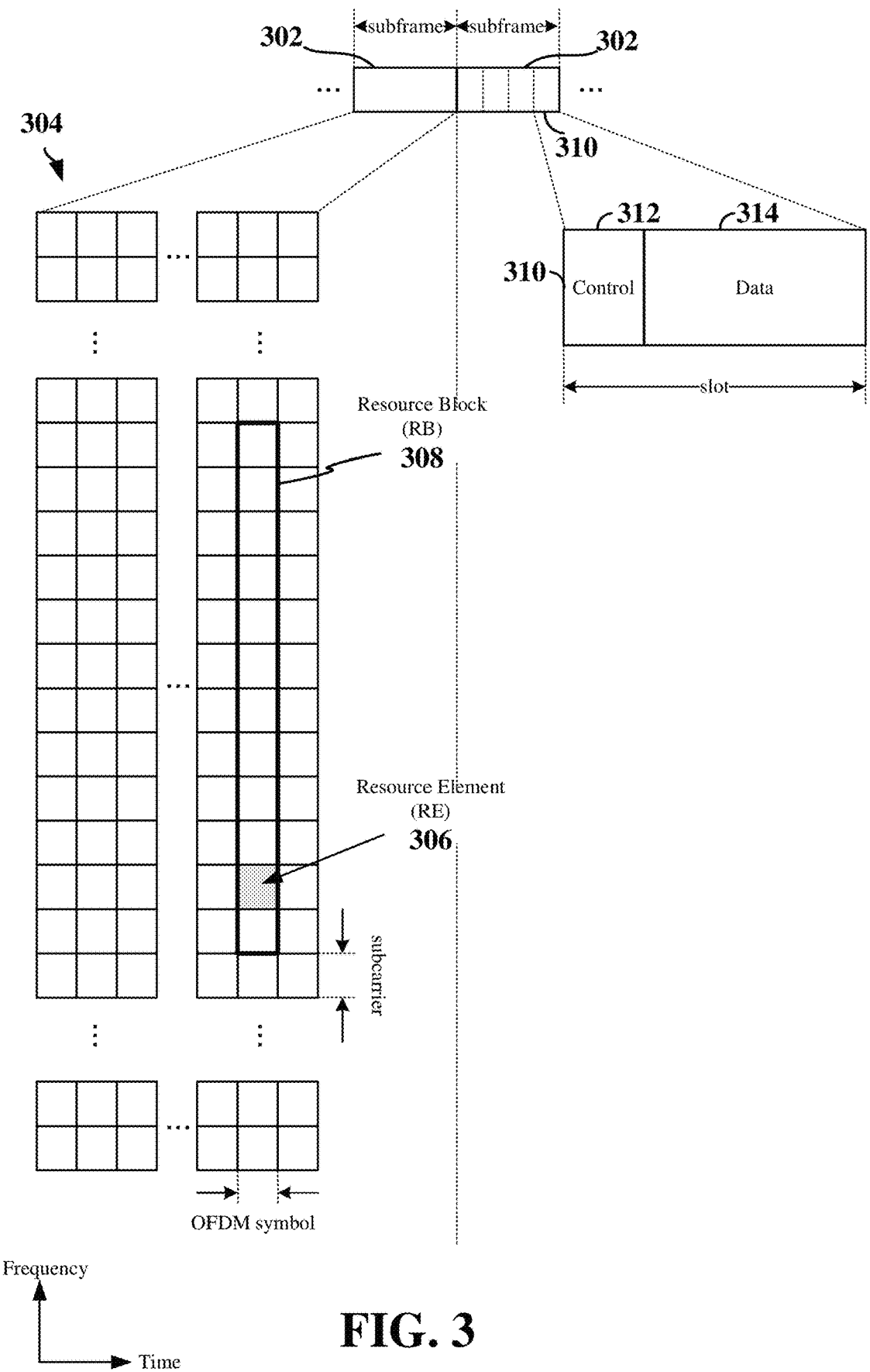
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random-access search space, a paging search space, downlink configuration information, and uplink configuration information, including, but not limited to, configuration information for random access and channel state information (CSI) reporting procedures associated with a scheduled entity type or a scheduled entity capability supported by the network. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
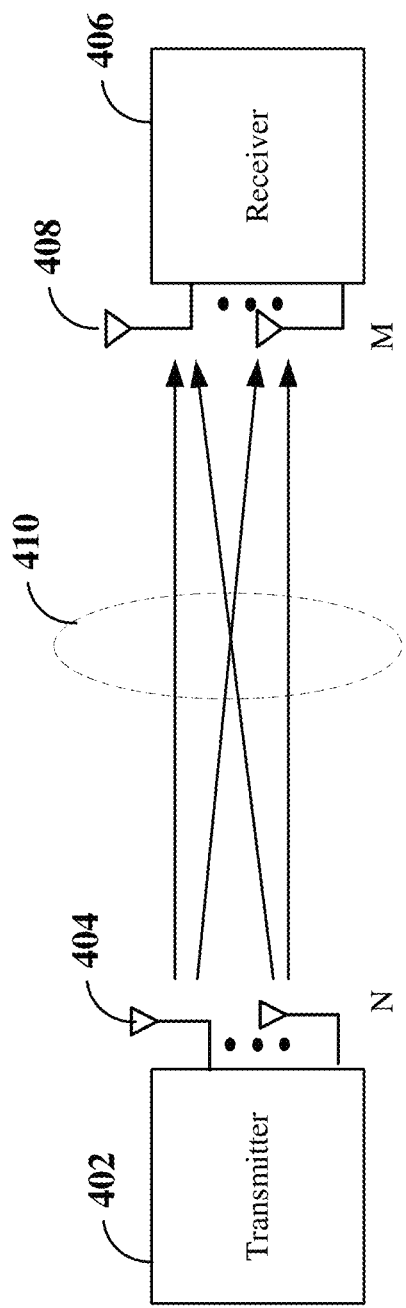
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner. The UE may measure the reference signal received power (RSRP), reference signal received quality (RSRQ) or SINR on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 5.

Figure 5:
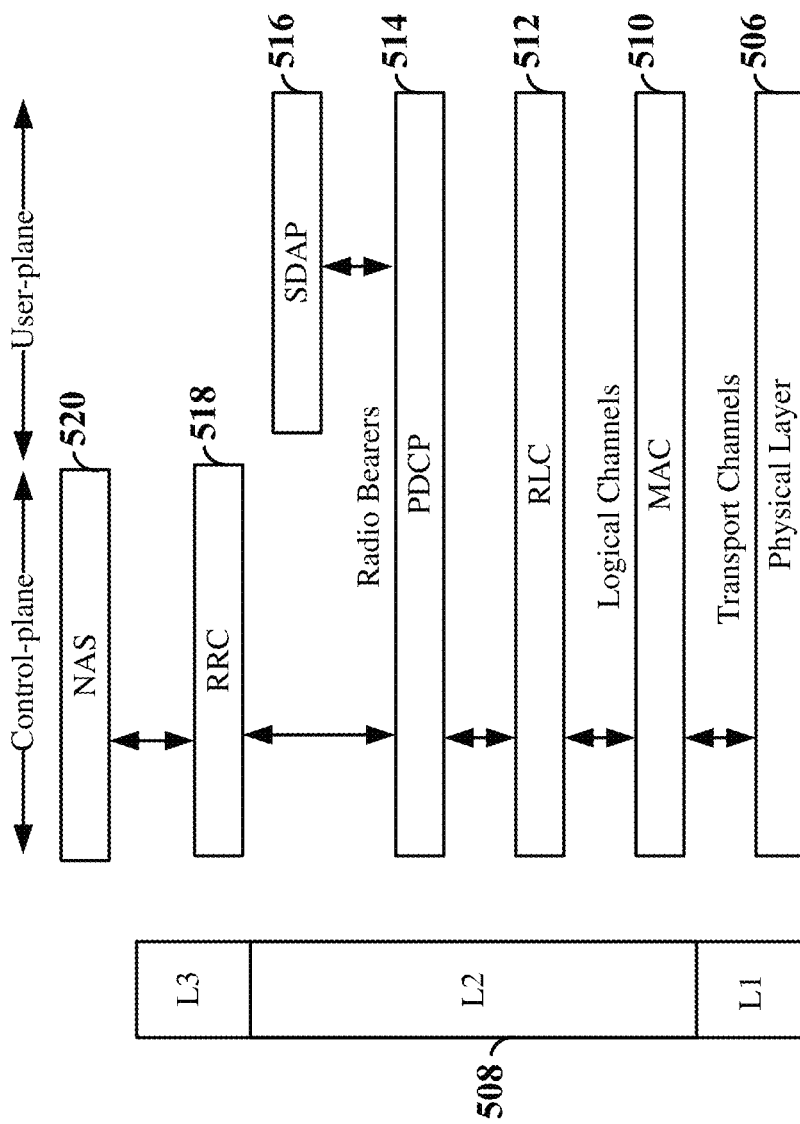
FIG. 5 is a block diagram illustrating a radio protocol architecture for the user and control planes according to some aspects.

As illustrated in FIG. 5, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer 506. L2 508 is above the physical layer 506 and is responsible for the link between the UE and base station over the physical layer 506.

In the user plane, the L2 layer 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L8 and a higher Non-Access Stratum (NAS) layer 520. The RRC layer 518 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non-Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

In order to gain access to a cell, a UE may perform a random-access procedure over a physical random-access channel (PRACH). The UE may identify a random-access search space including PRACH resources for initiating a RACH procedure from the SIB1. For example, a random-access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

Figure 6:
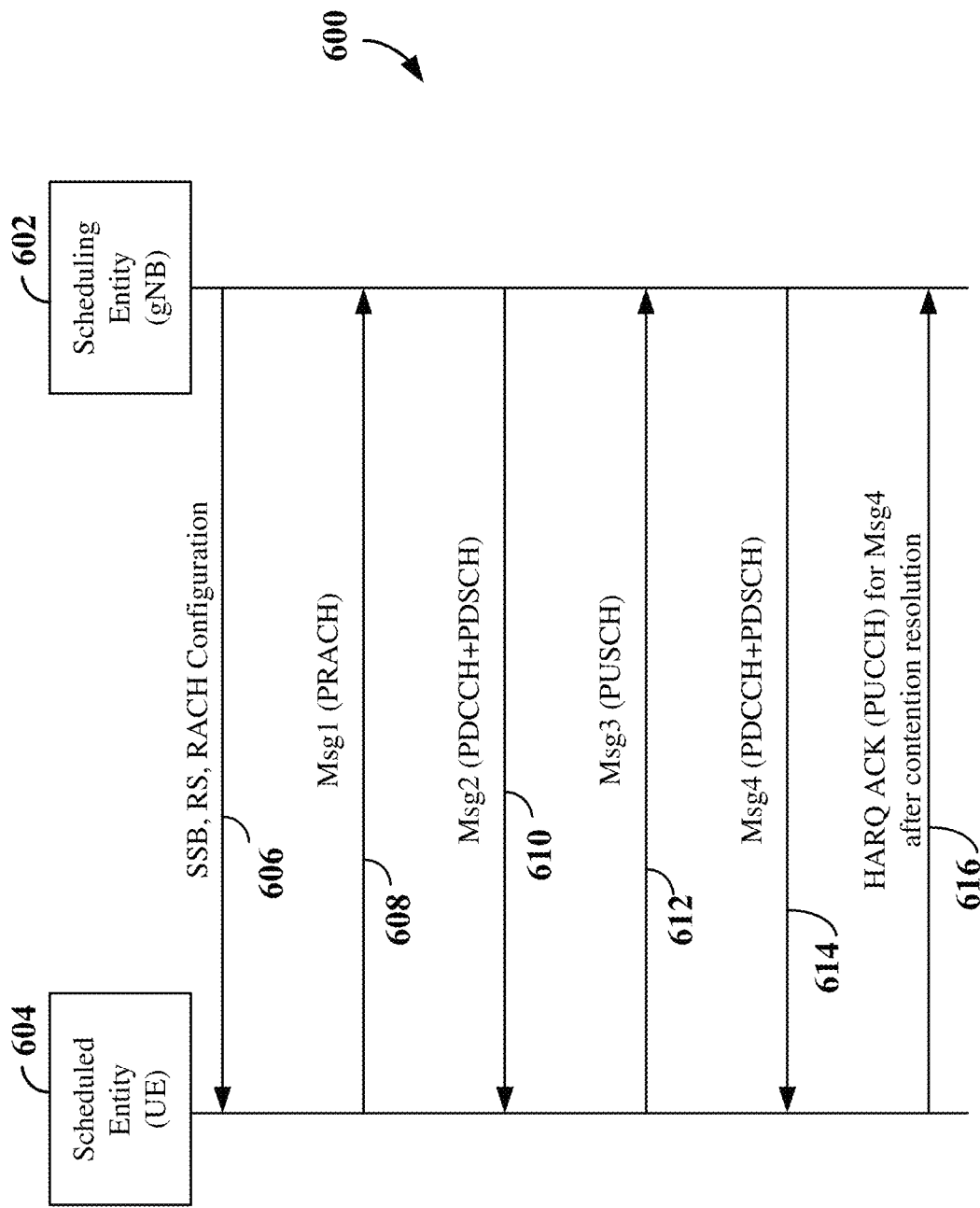
FIG. 6 is a diagram illustrating an example of a four-step random-access channel (RACH) procedure according to some aspects.

FIG. 6 is a diagram illustrating an example of a four-step random-access channel (RACH) procedure 600 according to some aspects. The RACH procedure 600 may be performed between a scheduling entity 602 and a scheduled entity 604. The scheduling entity 602 may correspond, for example, to a gNB or any of the scheduling entities shown in FIGS. 1 and/or 2. In addition, the scheduled entity 604 may correspond, for example, to a UE or any of the scheduled entities shown in FIGS. 1 and/or 2.

The random-access procedure 600 shown in FIG. 6 is initiated when the scheduled entity 604 first receives the SSB, reference signal (RS) configuration, and RACH configuration 606. The RACH configuration may indicate, for example, the RACH occasions allocated by the scheduling entity 602 (e.g., resources allocated for transmitting RACH preambles and receiving random access responses) and other suitable information. The scheduled entity 604 may then randomly select a preamble from an available set of preambles within the cell served by the scheduling entity 602, and transmit the selected preamble to the scheduling entity 602 in a RACH preamble message 608 (msg1) in a selected RACH occasion. In an example, the scheduled entity 604 may select from 64 possible preamble sequences for the selected RACH occasion for inclusion in the RACH preamble message 606. The msg1 608 may be transmitted by the scheduled entity 604 over a selected PRACH resource with power ramping. The selected PRACH resource may include supplementary uplink resources or normal uplink resources. Here, supplementary uplink resources include lower frequency resources than normal uplink resources. Thus, supplementary uplink resources and uplink resources each correspond to a different respective uplink frequency band. The msg1 608 may further be communicated on a beam selected by the scheduled entity 604 based on beam measurements (e.g., RSRP/RSRQ/SINR) performed by the scheduled entity 604. The beam may correspond, or is associated with, for example, a SSB beam.

If the preamble is successfully detected by the scheduling entity 602, the scheduling entity 602 transmits a random-access response (RAR) message 610 (msg2) including a PDCCH and PDSCH to the scheduled entity 604. If no msg2 (RAR) 610 is received within a RAR window, the scheduled entity 604 may retransmit msg1 608 with power boost. The msg2 610 (PDCCH+PDSCH) includes an identifier of the preamble sent by the scheduled entity 604, a Timing Advance (TA), a temporary cell radio network temporary identifier (TC-RNTI) or random-access (RA) RNTI for the scheduled entity 604 and a grant of assigned uplink (UL) resources. The PDCCH in msg2 610 may be scrambled with the RA-RNTI, which is a function of a RACH occasion (RO) (e.g., time-frequency resources allocated for RACH msg1) that the scheduled entity 604 used to send msg1 608. A medium access control-control element (MAC-CE) within the PDSCH provides an acknowledgement of the reception of msg1 608 and the UL grant. To receive msg2 610, the scheduled entity 604 may monitor DCI 1_0 for the PDCCH scrambled with the RA-RNTI corresponding to the RO used by the scheduled entity 604 to transmit msg1 608, and if detected, proceeds with PDSCH decoding. Upon receipt of the RAR message 610, the scheduled entity 604 compares the preamble ID to the preamble sent by the scheduled entity in the RACH preamble message 608. If the preamble ID matches the preamble sent in the RACH preamble message 608, the scheduled entity 604 applies the timing advance and starts a contention resolution procedure.

Since the preamble may be selected randomly by the scheduled entity, if another scheduled entity selects the same preamble in the same RO, a collision may result between the two scheduled entities. Any collisions may then be resolved using a contention resolution procedure. During contention resolution, the scheduled entity 604 transmits an uplink message (msg3) 612 such as a PUSCH on the common control channel (CCCH) using the TA and assigned uplink resources in the PDSCH of msg2 610. In an example, the uplink message 612 is a Layer 2/Layer 3 (L2/L3) message, such as a Radio Resource Control (RRC) Connection Request message. The uplink message 612 includes an identifier of the scheduled entity 604 (UE-ID) for use by the scheduling entity in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message, the scheduling entity 602 transmits a contention resolution message 614 (msg4) to the scheduled entity 604. The contention resolution message 614 may be, for example, an RRC-Connection Setup message. In addition, the contention resolution message 614 includes the identifier of the scheduled entity 604 that was received in the uplink message 612. The scheduled entity 604, upon receiving its own identity back in the contention resolution message 614, concludes that the random-access procedure was successful and completes the RRC connection setup process. Any other scheduled entity receiving the RRC-Connection Setup message with the identity of the scheduled entity 604 will conclude that the random-access procedure failed and re-initialize the random-access procedure. As mentioned above msg4 614 may have a PDCCH control component and a PDSCH payload component.

With the contention resolved, data may be communicated between the scheduled entity 604 and the scheduling entity 602 with the exchange of payloads in PUSCH and PDSCH messages. The scheduled entity may then transmit HARQ feedback (e.g., ACK/NACK) for the PDSCH payloads within, for example, PUCCH messages 616.

Figure 7:
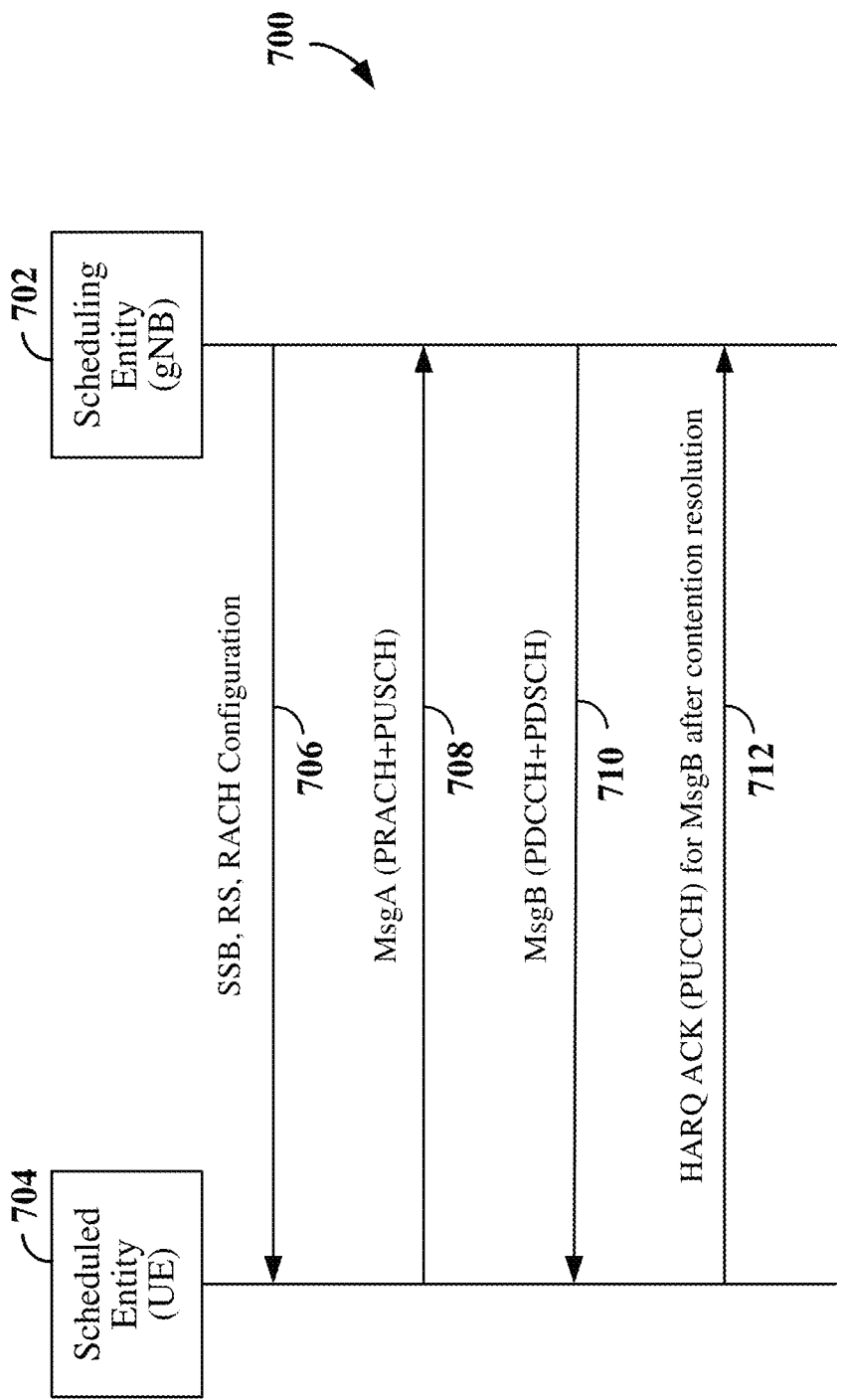
FIG. 7 is a diagram illustrating an example two-step RACH procedure according to some aspects.

FIG. 7 is a diagram illustrating an example two-step RACH procedure according to some aspects, where the four-step procedure 600 can be compressed into the two-step random-access procedure 700 illustrated in FIG. 7. The two-step random-access procedure 700 reduces overhead and latency associated with control signaling by removing a transmission in each direction between the scheduled entity 704 and the scheduling entity 702 (e.g., gNB). In comparison to FIG. 6, the two-step random-access procedure 700 uses the same SSB, RS and RACH configuration messages 706 as in the 4-step RA procedure described above. The 2 steps commence with a transmission by the scheduled entity 704 of a msgA 708 that includes the RACH preamble message and the uplink message of the contention-based random-access procedure shown in 600. Here, the uplink message may be a scheduled PUSCH transmission sent over a PUSCH resource and the RACH preamble message may be sent over a selected PRACH resource. The scheduling entity 702 responds with a single message (msgB 710) that includes the random-access response and the contention resolution message, similar to msg4 of the 4-step procedure discussed above. This message includes the PDCCH and PDSCH. The scheduled entity 704 responds 712 to msgB with HARQ ACK/NACK in a PUCCH message.

Prior to initiation of the physical random-access procedure, Layer 1 (see FIG. 5) may receive from higher layers a set of SS/PBCH block indexes and provides to higher layers a corresponding set of RSRP measurements. Prior to initiation of the physical random-access procedure, Layer 1 may receive from higher layers an indication to perform a Type-1 random access procedure, or a Type-2 random access procedure. Prior to initiation of the physical random-access procedure, Layer 1 may receive information from the higher layers, including, but not limited to, configuration of PRACH transmission parameters (PRACH preamble format, time resources, and frequency resources for PRACH transmission), parameters for determining the root sequences and their cyclic shifts in the PRACH preamble sequence set (e.g., index to logical root sequence table, cyclic shift, and set type).

From the physical layer perspective, the Type-1 L1 random access procedure may include the transmission of random-access preamble (e.g., msg1) in a PRACH, random access response (RAR) message with a PDCCH/PDSCH (e.g., msg2), and when applicable, the transmission of a PUSCH scheduled by a RAR UL grant, and PDSCH for contention resolution. Type-2 L1 random access procedure may include the transmission of random-access preamble in a PRACH and of a PUSCH (msgA) and the reception of a RAR message with a PDCCH/PDSCH (e.g., msgB), and when applicable, the transmission of a PUSCH scheduled by a fallback RAR UL grant, and PDSCH for contention resolution.

In some examples, scheduled entities may be operating in an operating environment that supports reduced-capability NR devices (also known as "NR Light"). NR light devices may be configured with lower device complexity and reduced energy consumption compared what can be provided by traditional NR devices and which, at the same time, have higher requirements in terms of data rates and latency compared to what can be provided with, for example, LTE machine-type communication (MTC) and narrowband internet of things (NB-IoT). In terms of reduced device complexity, NR light devices may be configured with support for reduced number of TX/RX antennas at the device side, reduction of the minimum required device bandwidth and/or support for devices only capable of half-duplex operation (no simultaneous TX/RX) in paired spectrum. In terms of reduced device energy consumption, NR Light devices may be configured with reduced complexity in PDCCH monitoring by reducing the number of required blind decoding, as well as extended discontinuous reception (DRX) functionality. One having ordinary skill in the art will appreciate that the examples in the present disclosure are suited for applications utilizing NR Light, although they may be equally applied in traditional NR configurations as well.

NR Light devices are configured to perform two-step or four-step RACH procedures in an initial bandwidth part (BWP) or active BWP. In some examples, the present disclosure discloses the utilization of early reporting of CSI and/or CQI during RACH procedures to improve performance More specifically, technologies and techniques are disclosed for reporting CSI measurement for short/small mobile originating (MO) data transfer by a scheduled entity in a RRC IDLE/INACTIVE state or a discontinuous reception (CDRX) mode of RRC connected state. In some examples, a scheduled entity may remain in an RRC IDLE/INACTIVE state after finishing the short data (small data) transfer, which saves scheduled entity power and reduces signaling complexity by reducing the signaling overhead. Utilizing link adaptation, for example, based on CSI/CQI reporting, such techniques may improve the coverage, power and spectral efficiency of NR Light devices when transmitting/receiving in the initial BWP or active BWP.

Figure 8:
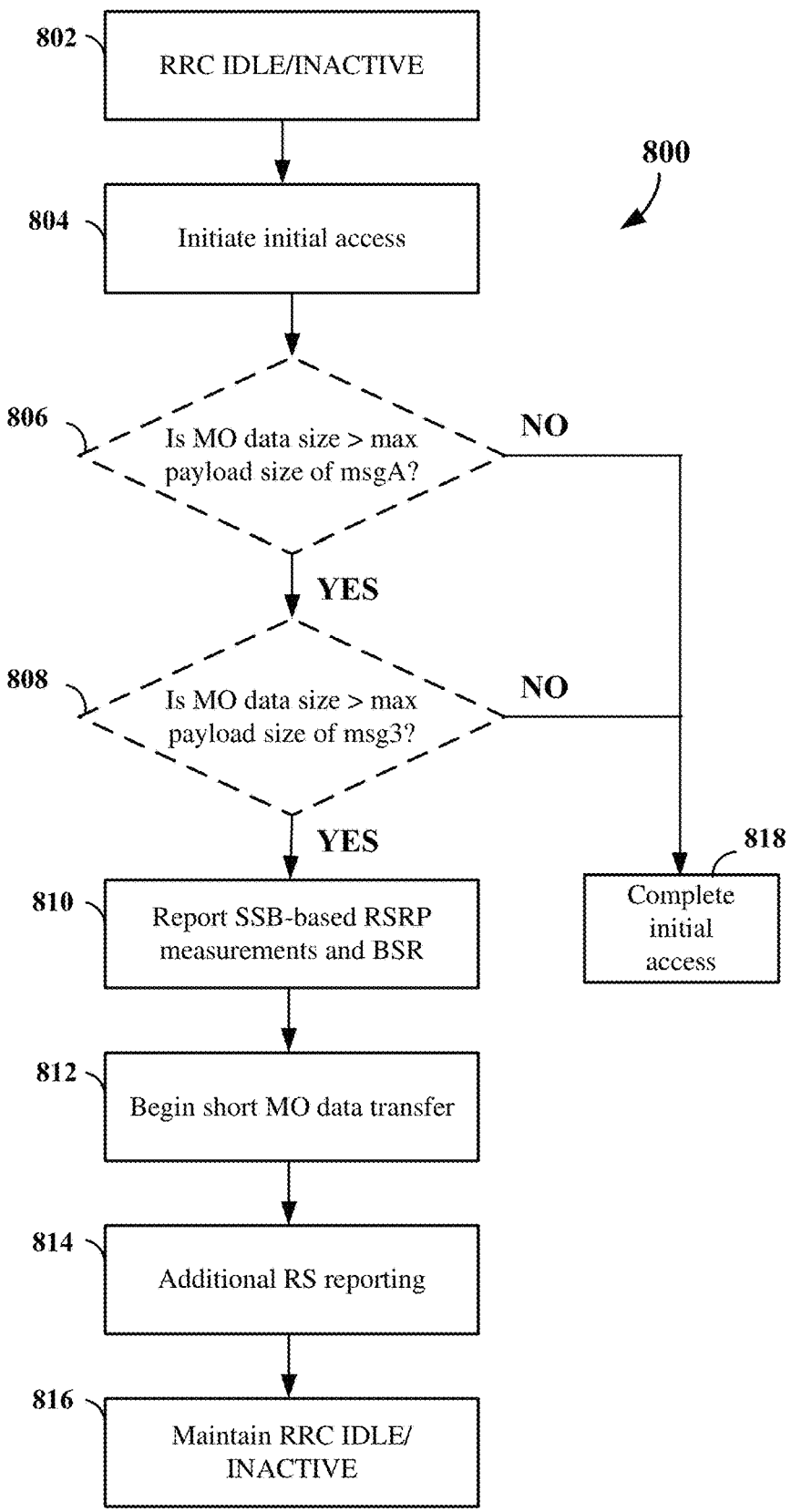
FIG. 8 is a flow diagram illustrating a process of providing channel state information (CSI) for short data transfer during an inactive state of a scheduled entity according to some aspects.

FIG. 8 is a flow diagram illustrating a process 800 of providing channel state information (CSI) for small data transfer during an inactive state of a scheduled entity according to some aspects. In block 802, a scheduled entity (e.g., 106) may initially be in an RRC IDLE/INACTIVE state, or alternately a discontinuous reception (CDRX) mode of RRC connected state. Generally speaking, a scheduled entity may be in any of three RRC states: RRC_IDLE, RRC_INACTIVE, and RRC_CONNECTED. After powering up, a scheduled entity may be in idle mode and, in order to perform data transfer or to make/receive voice calls, the scheduled entity would need to establish connection with the network using initial access via an RRC connection establishment procedure. Once RRC connection is established, the scheduled entity may change to RRC_CONNECTED mode.

If there is no activity to/from the scheduled entity for a certain amount of time, the network may order the scheduled entity to move to the RRC_IDLE state, in order to reduce the scheduled entity's power consumption. When a scheduled entity needs to perform some activity, it would need to transition to the connected mode which involves some RRC signaling and hence increased latency. In circumstances where a scheduled entity keeps sending small amounts of data very frequently, this would lead to frequent idle-connected-idle transitions, resulting in increased network signaling load in addition to increased latency. Accordingly, the scheduled entity may enter an RRC_INACTIVE state to reduce network signaling load as well as to reduce latency involved in transitioning to RRC_CONNECTED state.

In RRC_IDLE state, the scheduled entity may not be registered to a particular cell, and may not have an access stratum (AS) context and other information received from the network. The network may initiate the RRC connection release procedure to transition a scheduled entity in RRC_CONNECTED to RRC_IDLE state. During operation, the scheduled entity may be considered in a "sleep" mode and wake up periodically (according to a configured DRX cycle) to monitor for paging messages from the network. The network can reach a scheduled entity in RRC_IDLE state through paging messages, and to notify a scheduled entity in RRC_IDLE of system information change through short messages. Both paging messages and short messages may be addressed with P-RNTI on PDCCH, where paging messages may be sent on the paging control channel (PCCH), and short messages may be sent over PDCCH.

In RRC_IDLE, the scheduled entity may monitor the paging channels for CN-initiated paging, while in RRC_INACTIVE, the scheduled entity may also monitor paging channels for RAN-initiated paging. A scheduled entity may monitor paging channels continuously using a configured paging DRX, where the scheduled entity in RRC_IDLE or RRC_INACTIVE is only required to monitor paging channels during one Paging Occasion (PO) per DRX cycle. In this state, the scheduled entity itself manages mobility based on the network configurations via cell selections and/or re-selections. In an RRC_IDLE state, the scheduled entity may have transmission capabilities limited in the uplink, except for PRACH as part of RA procedure initiated when scheduled entity desires to transition to RRC_CONNECTED state or to request for on-demand system information.

As explained above, RRC_INACTIVE state is used to reduce network signaling load as well as to reduce latency involved in transitioning to RRC_CONNECTED state. Moreover, the scheduled entity in RRC_INACTIVE state is allowed to behave in a similar way as in RRC_IDLE state to save power. In an RRC_INACTIVE state, the AS context may be stored by both the scheduled entity and the gNB, as a result of which the state transition from inactive state to connected state is faster. Moreover, the core network connection may also be maintained. Similar to RRC_IDLE, the scheduled entity may be considered to be in a "sleep" mode and wake up periodically (according to configured DRX cycle) to monitor for paging messages from the network. The network can reach a scheduled entity in an RRC_INACTIVE state through paging messages, and to notify a scheduling entity in RRC_INACTIVE of a change of system information through short messages. Both paging messages and short messages may be addressed with P-RNTI on PDCCH, where paging messages may be sent on PCCH, and short messages may be sent over PDCCH directly.

The scheduled entity may monitor a paging channel for CN paging using a temporary mobile subscriber identity (e.g., 5G-S-TMSI) and RAN paging using, for example, full inactive RNTI (I-RNTI). I-RNTI may be used to identify the suspended scheduled entity context of a scheduled entity in RRC_INACTIVE state. In RRC_INACTIVE state, the scheduled entity may have transmission capabilities limited in the uplink, except for PRACH as part of RA procedure initiated when scheduled entity desires to transition to RRC_CONNECTED state or to request for on-demand system information.

Once the scheduled entity is in a RRC IDLE/INACTIVE state, in block 804, the scheduled entity may initiate an initial access procedure (e.g., a RACH procedure) in order to obtain initial access to a scheduling entity (e.g., gNB). In various aspects of the disclosure, the scheduled entity may transfer short mobile originating (MO) data to the serving cell during the initial access procedure. In some examples, the short MO data transfer may occur during msg3/msgA of the RACH procedure. In other examples, the initial access procedure may be an enhanced RACH procedure that facilitates the short MO data transfer after msg4 or msgB. In this example, to facilitate short MO data transfer during the enhanced RACH procedure, the scheduled entity can also provide SSB based RSRP measurements and a buffer status report (BSR) before transmitting the short MO data.

An SSB-Based RSRP measurement may be considered the linear average over the power contributions (in Watt) of the resource elements that carry SSS. The measurement time resource(s) for SSB-based RSRP may be confined within a SS/PBCH Block Measurement Time Configuration (SMTC) window duration. For SSB-based RSRP determinations, demodulation reference signals for PBCH and, if indicated by higher layers, CSI-RS in addition to SSS may be used. In some examples, SSB-based RSRP using a demodulation reference signal for PBCH or CSI-RS may be measured by linear averaging over the power contributions of the resource elements that carry corresponding reference signals, taking into account power scaling for the reference signals. The BSR may be considered a kind of MAC CE from the scheduled entity to the scheduling entity, carrying information indicating how much data is in the scheduled entity buffer to be sent out. The scheduling entity may then allocate the minimum amount of UL Grant (e.g., resources for PUSCH) if the resource is available, in order to optimize UL resources.

In decision block 806, the scheduled entity determines whether or not the short MO data size is greater than a maximum payload size of msgA. The maximum payload size may be determined by a plural of criteria configured by the network for the supported scheduled entity type or the scheduled entity capability. If it is not ("NO"), the process 800 proceeds to block 818, where the scheduled entity transfers the short MO data in msgA and completes the initial access procedure. Alternately or in addition, the scheduling entity may determine in decision block 808 if the MO data size is greater than a maximum payload size of msg3. If not ("NO"), the process 800 moves to block 818, where the scheduling entity transfers the short MO data in msg3 and completes the initial access procedure. It should be understood by those skilled in the art that decision blocks 806 and 808 may be implemented in the alternative depending on the type of RACH procedure being utilized (e.g., two-step RACH or four-step RACH). Thus, if, in decision block 806, the scheduled entity determines that the short MO data size is greater than a maximum payload size of msgA ("YES"), the process 800 may continue directly to block 810, and not perform decision block 808. Also, the process 800 may skip decision block 806 after block 804 and continue directly to decision block 808, where, if the scheduled entity determines that the short MO data size is greater than a maximum payload size of msg3 ("YES"), the process 800 continues to block 810. In some examples, the scheduled entity may be configured to perform both decision blocks 806 and 808.

Once the scheduled entity determines that the short MO data size is greater than msgA (and/or msg 3), the scheduled entity reports SSB-based RSRP measurements and BSR in block 810, before initiating short MO data transfer (e.g., via the enhanced RACH procedure) in block 812. In some examples, during the process of transferring short MO data, the scheduling entity may schedule additional reference signals (RS) for CSI measurements and request the scheduled entity's CSI/CQI reporting on PUSCH channel in block 814. In some examples, after completing short MO data transfer (812) and any additional RS reporting (814), the scheduled entity may remain in RRC IDLE/INACTIVE state, which may reduce the scheduled entity's power consumption and/or signal complexity by reducing the signaling overhead.

Figure 9:
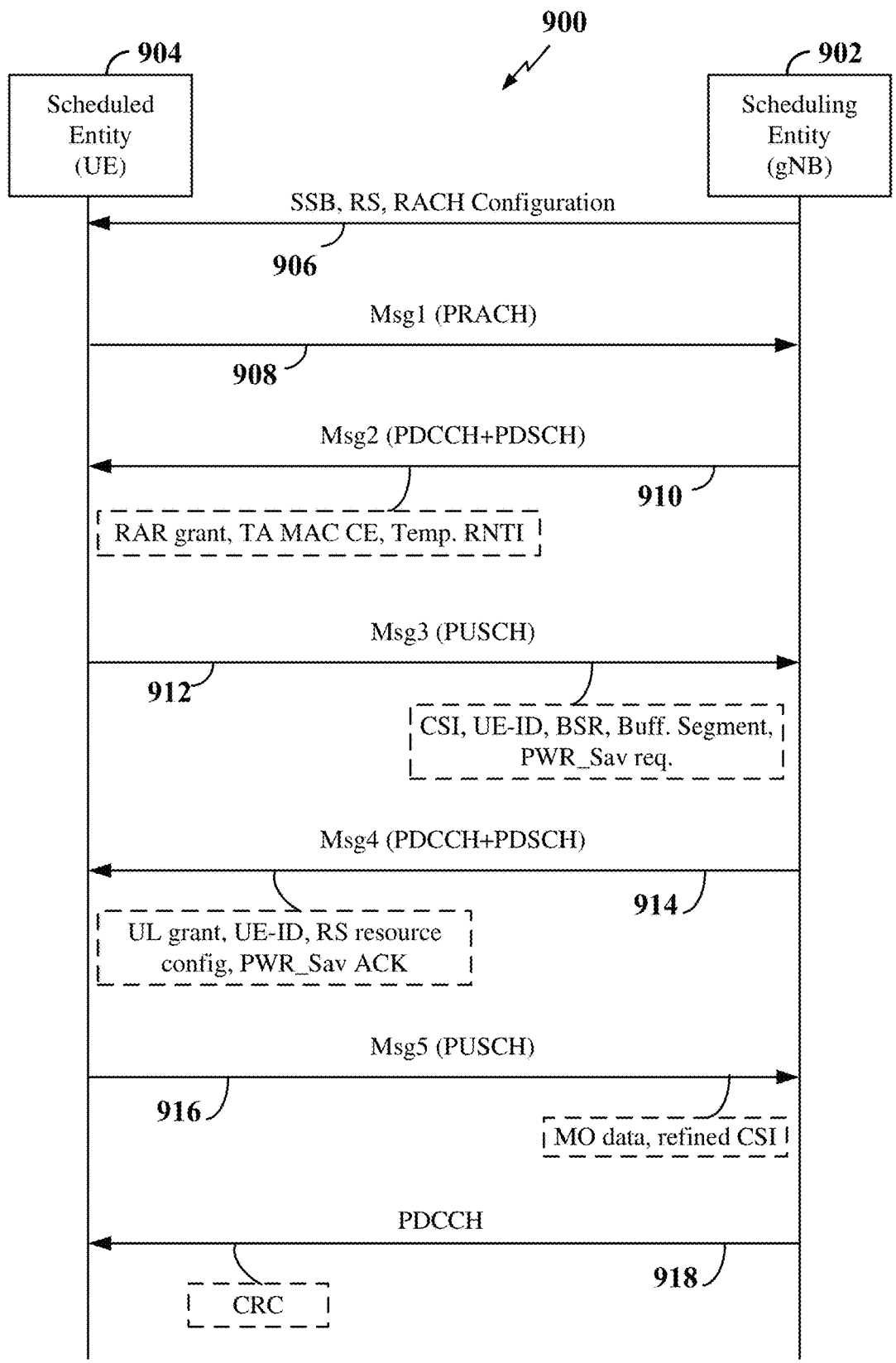
FIG. 9 is a signaling diagram for providing channel state information for short data transfer using an enhanced 4-step RACH procedure according to some aspects.

FIG. 9 is a signaling diagram 900 for providing channel state information for short data transfer using an enhanced 4-step RACH procedure according to some aspects. The 4-step RACH procedure of FIG. 9 may be similar to the 4-step RACH procedure of FIG. 6, with the additional and/or alternate features discussed below. As can be seen in the figure, a scheduled entity 904 receives SSB, RS, and RACH configurations in 906 from a scheduling entity 902. The scheduled entity (UE) further selects a PRACH resource (RACH occasion), for example, based on layer 1 reference signal received power (L1-RSRP) measurements of SSB beams and transmits msg1 to the scheduling entity 902. Once the scheduling entity 902 detects msg1, it may transmit msg2 in 910 and include at least a RAR grant for msg3, a time advance MAC control element (TA MAC CE), and a temporary RNTI (e.g., 16-bit TC-RNTI, or a random number more than 16 bits).

After the scheduled entity decodes msg2, the scheduled entity may adjust the uplink timing and transmit msg3 in 912, where the payload of msg3 includes at least a CSI report (e.g., SSB-based RSRP measurement), UE-ID and BSR. The payload of msg3 may further include an indication to the scheduling entity 902 of whether or not the buffered data can be segmented, and a request to remain in a power saving mode (e.g., IDLE/INACTIVE state) after the short MO data transfer is completed. After the scheduling entity 902 decodes msg3, it transmits msg4 (PDCCH+PDSCH) 914 that may include an uplink (UL) grant for the short MO data transfer, based on the CSI report in msg3, UE-ID (full or partial), resource signal (RS) configuration for the scheduled entity's CSI measurements (if the UL grant is insufficient for the MO data), and an acknowledgement (ACK) to the scheduled entity's request to stay in power saving mode. After the scheduled entity 904 decodes msg4, it may transmit PUSCH in msg5 916, which carries the short MO data on the granted resources. In some examples, if the scheduling entity 902 has configured RS resources (e.g., CSI-RS resources) in msg4, the scheduled entity 904 may measure the RS and report the MO data, refined CSI (and/or CQI) to the scheduling entity (BS) 902. The refined CSI or CQI may be multiplexed with the segmented MO data in msg5.

In some examples, after the scheduling entity 902 decodes msg5, it may transmit a PDCCH 918 that may include a CRC, masked by the temporary RNTI. If the short MO data transfer is completed, the scheduling entity 902 may transmit an ACK and UE-ID in DCI of the PDCCH 918 to complete the short MO data transfer. If the short MO data transfer is not completed, the scheduling entity 902 may transmit another UL grant in DCI of the PDCCH 918 to schedule any remaining data.

Figure 10:
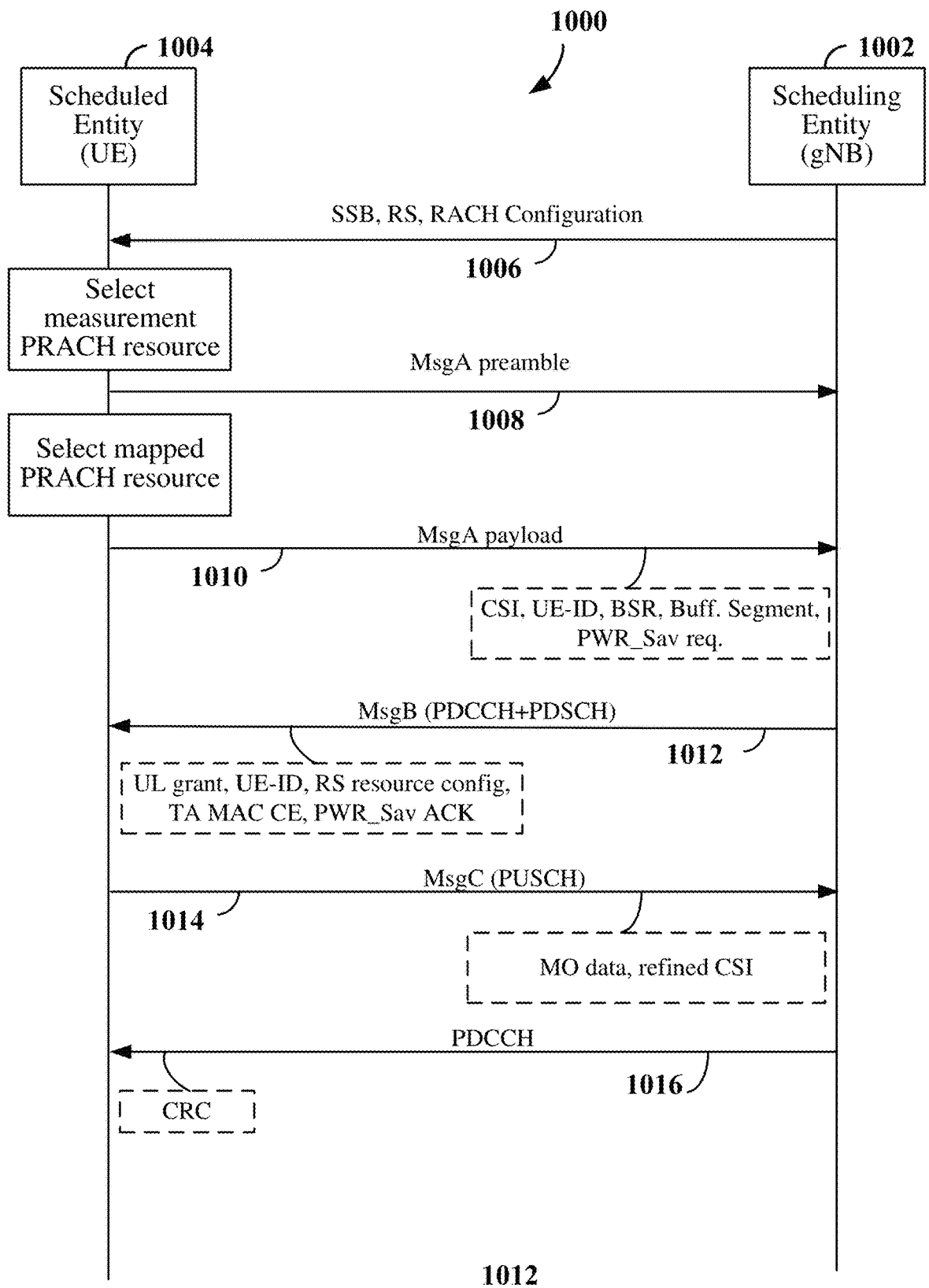
FIG. 10 is a signaling diagram for providing channel state information for short data transfer using an enhanced 2-step RACH procedure according to some aspects.

FIG. 10 is a signaling diagram 1000 for providing channel state information for short data transfer using an enhanced 2-step RACH procedure according to some aspects. The 2-step RACH procedure of FIG. 10 may be similar to the 2-step RACH procedure of FIG. 7, with the additional and/or alternate features discussed below. As can be seen in the figure, scheduled entity (UE) 1004 receives SSB, RS, and RACH configurations in 1006 from scheduling entity 1002. The scheduled entity 1004 further selects a PRACH resource (RACH occasion), for example, based on layer 1 reference signal received power (L1-RSRP) measurements of SSB beams and transmits a msgA preamble 1008 to the scheduling entity 1002 on the selected PRACH resource. The scheduled entity 1004 may then select a PUSCH resource, based on a mapping rule determined by the scheduling entity 902 (e.g., indicated in SI) and transmit a msgA payload 1010 on the selected PUSCH resource. The msgA payload can include at least a CSI report (e.g., SSB-based RSRP measurement), UE-ID and BSR. The msgA payload may further include an indication to the scheduling entity 902 of whether or not buffered data can be segmented, and a request to stay in power saving mode (e.g., IDLE/INACTIVE state) after the short MO data transfer is completed.

After the scheduling entity 1002 decodes msgA, it may respond with msgB (PDCCH+PDSCH) 1012 that may include an uplink (UL) grant for short MO data transfer, based on the CSI report in msgA, UE-ID (full or partial), a temporary RNTI (e.g., a 16-bit TC-RNTI or a random number more than 16 bits), RS configuration for the scheduled entity's CSI measurements (if the UL grant is insufficient for the short MO data), a TA MAC CE, and an ACK to the scheduled entity's request to stay in power mode. After the scheduled entity 1004 decodes msgB, it may transmit PUSCH in msgC 1014, which is configured to carry short MO data on the granted resources. In some examples, if the scheduling entity 1002 has configured RS in msgB, the scheduled entity 1004 may measure the supplementary RS and report the refined CSI and/or CQI. The refined CSI and/or CQI may be multiplexed with segmented short MO data on PUSCH in msgC.

After the scheduling entity 1002 decodes msgC, it may transmit a PDCCH 1016 with CRC masked by the temporary RNTI. If the short MO data transfer is completed, the scheduling entity 1002 may transmit an acknowledgement (ACK) and UE-ID in DCI of the PDCCH 1016 to complete the short MO data transfer. If the short MO data transfer is not completed, the scheduling entity 1002 may transmit another UL grant in DCI of the PDCCH 1016 to schedule the remaining MO data.

Figure 11:
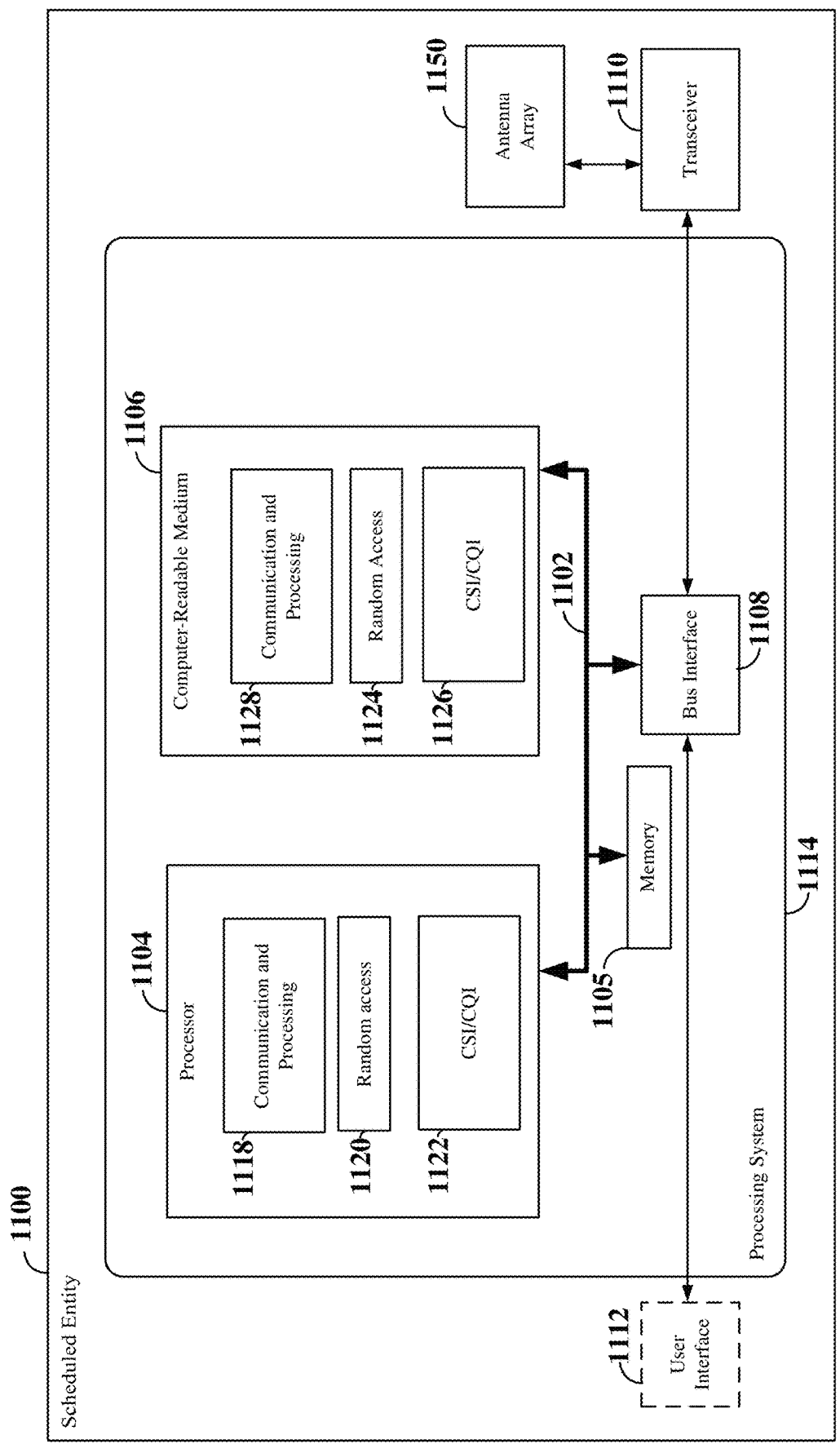
FIG. 11 is a block diagram illustrating an example of a hardware implementation for a scheduled entity employing a processing system according to some aspects.

FIG. 11 is a block diagram illustrating an example of a hardware implementation for a scheduled entity (UE) 1100 employing a processing system 1114 according to some aspects. For example, the scheduled entity 1100 may be a user equipment (UE) as illustrated in any one or more of FIGS. 1 and/or 2.

The scheduled entity 1100 may be implemented with a processing system 1114 (or "processing apparatus") that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1100 may be configured to perform any one or more of the functions described herein, including, but not limited to, NR and NR light communications, including RACH procedures and CSI/CQI reporting as described above. That is, the processor 1104, as utilized in the scheduled entity 1100, may be used to implement any one or more of the processes and procedures described herein.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102, a transceiver 1110, and an antenna array 1150. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, processor 1104 may include circuitry configured for various functions. For example, the processor 1104 may include communication and processing circuitry 1218, configured to communicate with a base station (e.g., gNB or eNB) via a Uu link. In some examples, the communication and processing circuitry 1118 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1118 may include one or more transmit/receive chains.

In some implementations where the communication involves receiving information, the communication and processing circuitry 1118 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1118 may output the information to another component of the processor 1104, to the memory 1105, or to the bus interface 1108. In some examples, the communication and processing circuitry 1118 may receive one or more of signals, messages, other information, or any combination thereof. In some examples, the communication and processing circuitry 1118 may receive information via one or more channels. In some examples, the communication and processing circuitry 1118 may include functionality for a means for receiving. In some examples, the communication and processing circuitry 1118 may include functionality for a means for processing, including a means for demodulating, a means for decoding, etc.

In some implementations where the communication involves sending (e.g., transmitting) information, the communication and processing circuitry 1118 may obtain information (e.g., from another component of the processor 1104, the memory 1105, or the bus interface 1108), process (e.g., modulate, encode, etc.) the information, and output the processed information. For example, the communication and processing circuitry 1118 may output the information to the transceiver 1110 (e.g., that transmits the information via radio frequency signaling or some other type of signaling suitable for the applicable communication medium). In some examples, the communication and processing circuitry 1118 may send one or more of signals, messages, other information, or any combination thereof. In some examples, the communication and processing circuitry 1118 may send information via one or more channels. In some examples, the communication and processing circuitry 1118 may include functionality for a means for sending (e.g., a means for transmitting). In some examples, the communication and processing circuitry 1118 may include functionality for a means for generating, including a means for modulating, a means for encoding, etc.

In some examples, the communication and processing circuitry 1118 may be configured to communicate (e.g., transmit/receive) beamformed signals at a mmWave frequency or a sub-6 GHz frequency via the transceiver 1110 and the antenna array 1150. The communication and processing circuitry 1118 may further be configured to execute communication and processing instructions (software) 1128 stored in the computer-readable medium 1106 to implement one or more of the functions described herein.

In some aspects of the disclosure, the processor 1104 may include random access circuitry 1120 configured to implement, for example, initial access and RACH procedures described herein, such as technologies and techniques described in FIGS. 6-10 above. The random-access circuitry 1120 may further be configured to execute random access instructions (software) 1124 stored in the computer-readable medium 1106 to implement one or more of the functions described herein. In addition, the processor 1104 may include CSI/CQI circuitry 1122 configured, for example, to implement CSI/CQI reporting, such as those described herein, and techniques described in FIGS. 6-10 above. The CSI/CQI circuitry 1122 may further be configured to execute CSI/CQI instructions (software) 1126 stored in the computer-readable medium 1106 to implement one or more of the functions described herein.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-2 and 4, and utilizing, for example, the processes and/or algorithms described herein.

Figure 12:
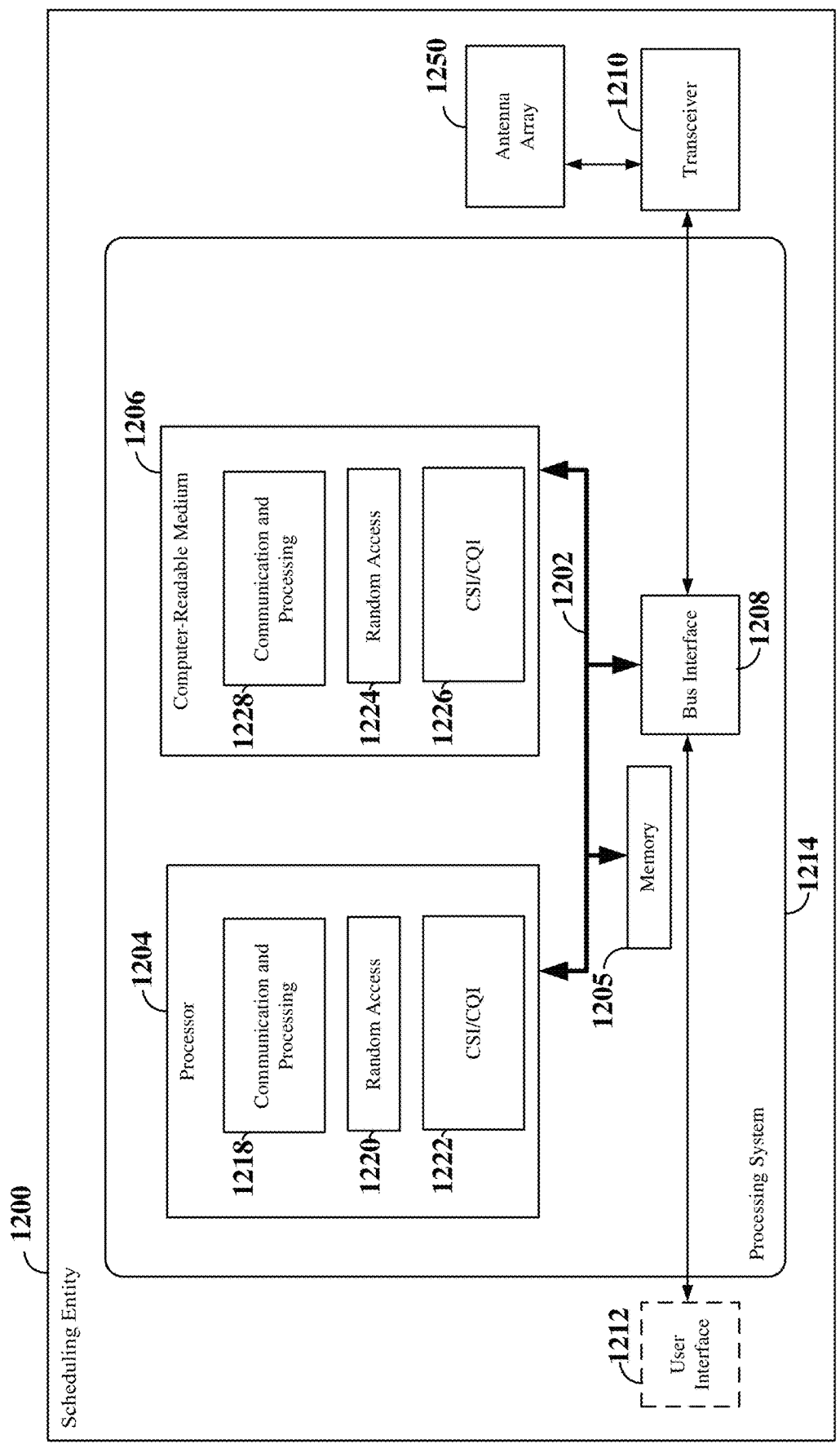
FIG. 12 is a block diagram illustrating an example of a hardware implementation for a scheduling entity employing a processing system according to some aspects.

FIG. 12 is a block diagram illustrating an example of a hardware implementation for a scheduling entity 1200 employing a processing system according to some aspects. For example, the scheduling entity 1200 may be a base station (such as eNB, gNB), or other scheduling entity as illustrated in any one or more of FIGS. 1 and 2.

The scheduling entity 1200 may be implemented with a processing system 1214 that includes one or more processors 1204. The processing system 1214 may be substantially the same as the processing system 1114 illustrated in FIG. 11, including a bus interface 1208, a bus 1202, memory 1205, a processor 1204, and a computer-readable medium 1206. Furthermore, the scheduling entity 1200 may include an optional user interface 1212, a transceiver 1210, and an antenna array 1250 substantially similar to those described above in FIG. 11. The processor 1204, as utilized in a scheduling entity 1200, may be used to implement any one or more of the processes described below.

In some aspects of the disclosure, the processor 1204 may include circuitry configured for various functions. For example, the processor 1204 may include communication and processing circuitry 1218, which may be configured similarly to circuitry 1118 described above in connection with FIG. 11. The communication and processing circuitry 1218 may further be configured to execute communication and processing instructions (software) 1228 stored in the computer-readable medium 1206 to implement one or more of the functions described herein.

The processor 1204 may further include random access circuitry 1220, configured to implement, for example, initial access and RACH procedures described herein, such as technologies and techniques described in FIGS. 6-10 above. The random-access circuitry 1220 may further be configured to execute random access instructions (software) 1224 stored in the computer-readable medium 1206 to implement one or more of the functions described herein. In addition, the processor 1204 may include CSI/CQI circuitry 1122 configured, for example, to implement CSI/CQI report processing and signaling, such as those described herein, and techniques described in FIGS. 6-10 above. The CSI/CQI circuitry 1222 may further be configured to execute CSI/CQI instructions (software) 1226 stored in the computer-readable medium 1206 to implement one or more of the functions described herein.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-2 and 4, and utilizing, for example, the processes and/or algorithms described herein.

Figure 13:
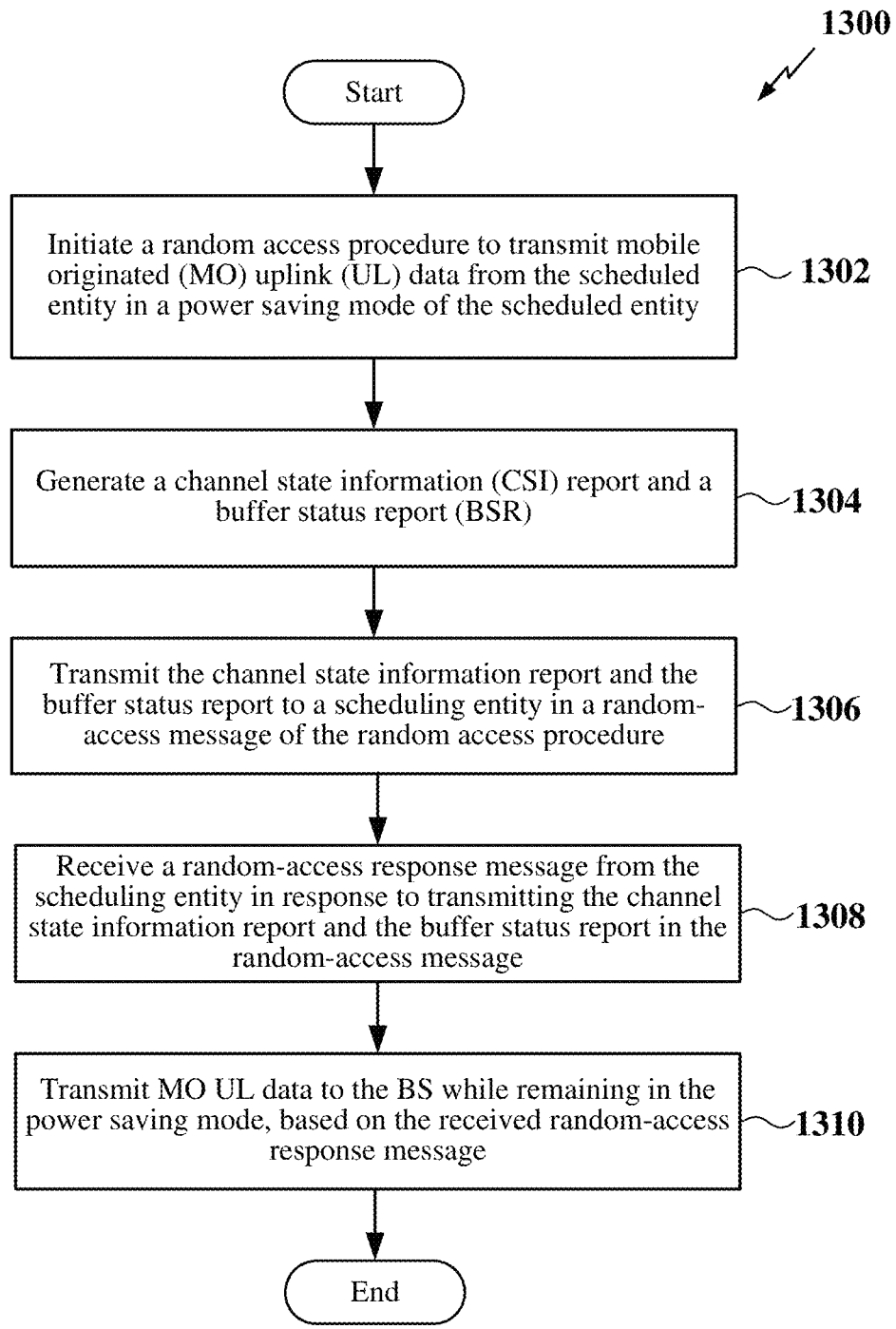
FIG. 13 is a flow chart illustrating an exemplary process 1300 for a scheduled entity transmitting channel state information reports and scheduled entity data in a power saving mode according to some aspects.

FIG. 13 is a flow chart illustrating an exemplary process 1300 for a scheduled entity (UE) (e.g., 106) transmitting channel state information reports (e.g., CSI/CQI) and UE data (e.g., short MO data) in a power saving mode according to some aspects. In some examples, the process 1300 may be carried out by the scheduled entity 1100 illustrated in FIG. 11. In some examples, the process 1300 may be carried out by any suitable apparatus or means for carrying out the functions or algorithm described below.

In block 1302, a UE may initiate a random-access procedure to transmit mobile originated (MO) uplink (UL) data from the scheduled entity in a power saving mode of the scheduled entity. The UE may further generate a channel state information report and a buffer status report in block 1304. For example, the random-access procedure may be a Type-1 or Type-2 random access procedure. The channel state information reports and buffer status reports may be generated using any of the technologies and techniques described above in connection with FIGS. 8-10. In some examples, the power saving mode may include a RRC idle state, a RRC inactive state, or a discontinuous reception (CDRX) mode of RRC connected state. For example, the random-access circuitry 1120, CSI/CQI circuitry 1122, together with the communication and processing circuitry 1118 and transceiver 1110, shown and described above in connection with FIG. 11 may provide a means to initiate a random-access procedure to transmit MO UL data from a power saving mode of the UE, and to generate a channel state information report and a buffer status report.

In block 1306, the scheduled entity may transmit the channel state information report and the buffer status report to a scheduling entity (e.g., a base station (BS), such as BS 108) in a random-access message of the random-access procedure. In some examples, the channel state information report may include an SSB-based RSRP measurement and an associated SSB beam index, or a compressed or refined CSI report and the associated beam index of the downlink resource signals (DL RS). In some examples, the generating the buffer status report may include determining that a size of the MO data is greater than a maximum payload size of a random-access message including CCCH information. In some examples, the generating the buffer status report may include determining that a size of the MO data is greater than a maximum payload size of the random-access message transmitted on a PUSCH. In some examples, the generating the buffer status report may include determining that buffered data in the buffer can be segmented. For example, the random-access circuitry 1120, CSI/CQI circuitry 1122, together with the communication and processing circuitry 1118 and transceiver 1110, shown and described above in connection with FIG. 11 may provide a means to transmit channel state information report and the buffer status report.

In block 1308, the UE may receive a random-access response message from the BS in response to transmitting the channel state information report and the buffer status report in the random-access message. The random-access response message from the scheduling entity may include, for example, msg4 or msgB data described above. For example, the random-access circuitry 1120, CSI/CQI circuitry 1122, together with the communication and processing circuitry 1118 and transceiver 1110, shown and described above in connection with FIG. 11 may provide a means to receive a random-access response message from the BS in response to transmitting the channel state information report and the buffer status report in the random-access message.

In block 1310, the scheduled entity may transmit MO UL data to the BS while remaining in the power saving mode, based on the received random-access response message. In some examples, transmitting the MO data to the BS may include transmitting the segmented MO data from the buffer, and may further include multiplexing a refined channel state information report with segmented portions of the MO data from the buffer. For example, the random-access circuitry 1120, CSI/CQI circuitry 1122, together with the communication and processing circuitry 1118 and transceiver 1110, shown and described above in connection with FIG. 11 may provide a means to transmit MO data to the BS while remaining in the power saving mode, based on the received random-access response message.

Figure 14:
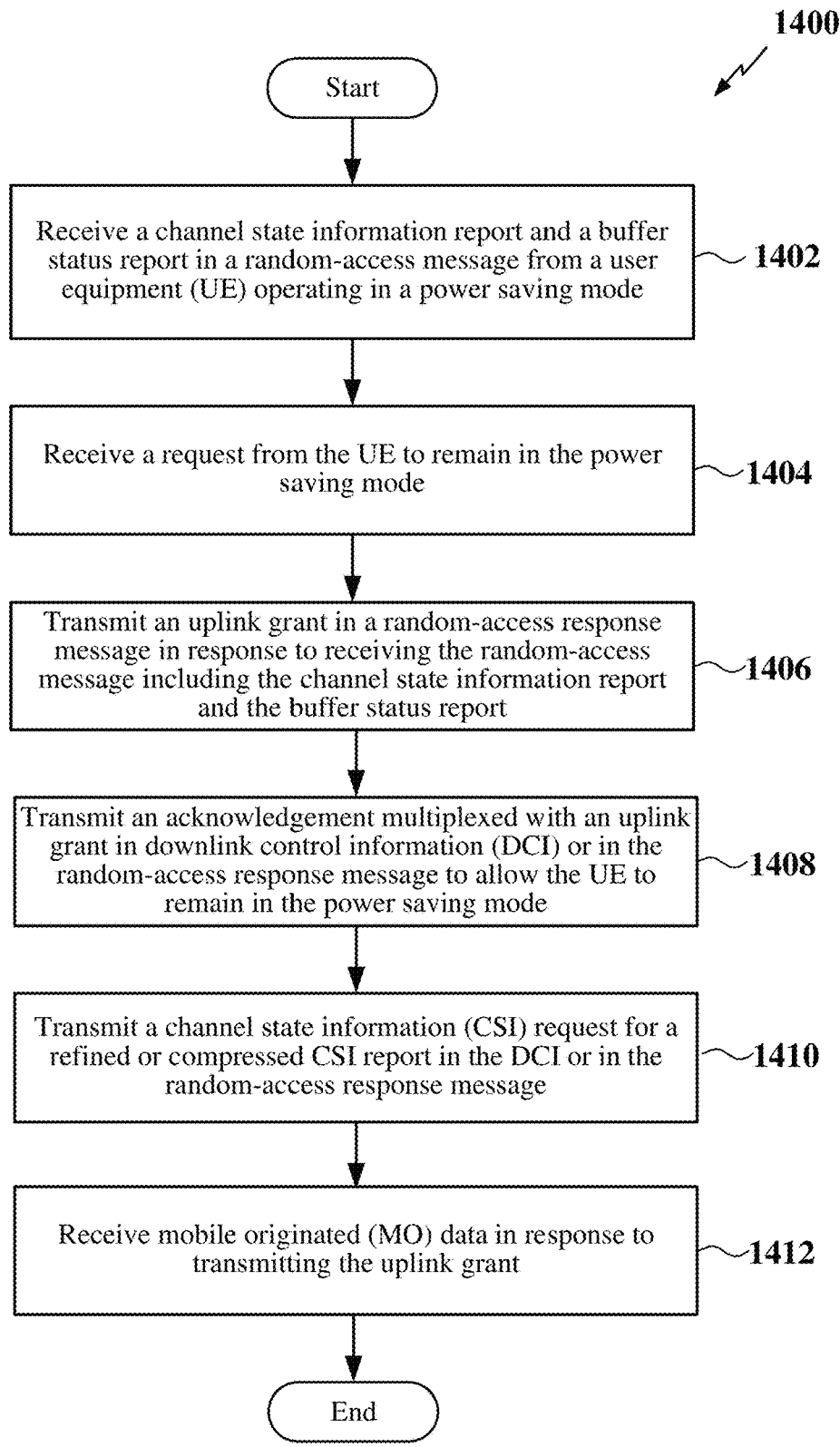
FIG. 14 is a flow chart illustrating an exemplary process 1400 for a scheduling entity receiving channel state information reports and scheduled entity data in a power saving mode according to some aspects.

FIG. 14 is a flow chart illustrating an exemplary process 1400 for a scheduling entity (BS) (e.g., 108) receiving channel state information reports (e.g., CSI/CQI) and scheduled entity (UE) data (e.g., short MO data) in a power saving mode according to some aspects. In some examples, the process 1400 may be carried out by the scheduling entity 1200 illustrated in FIG. 12. In some examples, the process 1400 may be carried out by any suitable apparatus or means for carrying out the functions or algorithm described below.

In block 1402, the BS may receive a channel state information report and a buffer status report in a random-access message from a UE operating in a power saving mode. In some examples, the channel state information report data may include an SSB-based RSRP. In some examples, the buffer status report data may include an indication that a buffer of the UE can be segmented. In one example, the power saving mode may include a RRC idle state, or a RRC inactive state, or a CDRX mode of RRC connected state. For example, the random-access circuitry 1220, CSI/CQI circuitry 1222, together with the communication and processing circuitry 1218 and transceiver 1210, shown and described above in connection with FIG. 12 may provide a means to receive the channel state information report and buffer status report from a UE operating in a power saving mode.

In block 1404 the BS may receive a request from the UE to remain in the power saving mode. The BS may further transmit an uplink grant in a random-access response message in response to receiving the random-access message, including the channel state information report and the buffer status report in block 1406. For example, the random-access circuitry 1220, CSI/CQI circuitry 1222, together with the communication and processing circuitry 1218 and transceiver 1210, shown and described above in connection with FIG. 12 may provide a means to receive a request from the UE to remain in the power saving mode, and transmit an uplink grant in a random-access response message in response to receiving the random-access message, including the channel state information report and the buffer status report.

In block 1408, the BS may then transmit an acknowledgement multiplexed with an uplink grant in downlink control information (DCI) or in the random-access response message to allow the UE to remain in the power saving. The BS may further transmit a channel state information (CSI) request for a refined or compressed CSI report in the DCI or in the random-access response message in block 1410. In block 1412, the BS may then receive mobile originated (MO) data in response to transmitting the uplink grant. In some examples, receiving the MO data may include receiving a refined channel state information report multiplexed with segmented portions of the MO data. For example, the random-access circuitry 1220, CSI/CQI circuitry 1222, together with the communication and processing circuitry 1218 and transceiver 1210, shown and described above in connection with FIG. 12 may provide a means to transmit an acknowledgement multiplexed with an uplink grant in the DCI or in the random-access response message to allow the UE to remain in the power saving, transmit a CSI request for a refined or compressed CSI report in the DCI or in the random-access response message, and receive the MO data in response to transmitting the uplink grant.

Of course, in the above examples, the circuitry included in the processors 1104, 1204 are merely provided as examples, and other means for carrying out the described functions may be included within various aspects of the present disclosure, including but not limited to the instructions stored in the computer-readable storage mediums 1106, 1206, or any other suitable apparatus or means described in any one of the FIGS. 1, 2, 4, 6-7 and/or 9-10, and utilizing, for example, the processes and/or algorithms described herein in relation to FIGS. 13 and 14.

The processes shown in FIGS. 13 and 14 may include additional aspects, such as any single aspect or any combination of aspects described below and/or in connection with one or more other processes described elsewhere herein.

Aspect 1: A method of wireless communication of a scheduled entity in a wireless communication network, the method comprising: initiating a random access procedure to transmit mobile originated (MO) uplink (UL) data from the scheduled entity in a power saving mode of the scheduled entity; generating a channel state information (CSI) report and a buffer status report (BSR); transmitting the channel state information report and the buffer status report to a scheduling entity in a random-access message of the random access procedure; receiving a random-access response message from the scheduling entity in response to transmitting the channel state information report and the buffer status report in the random-access message; and transmitting the MO UL data to the scheduling entity while remaining in the power saving mode, based on the received random-access response message.

Aspect 2: The method of aspect 1, further comprising: receiving configuration information for random access and channel state information (CSI) reporting procedures associated with a scheduled entity type or a scheduled entity capability supported by the wireless communication network.

Aspect 3: The method of aspect 1 or 2, wherein the channel state information report comprises one of a synchronization signal block (SSB)-based reference signal received power (RSRP) measurement and an associated SSB beam index, or a refined CSI report and an additional associated beam index of a downlink resource signals (DL RS) utilized to obtain the refined CSI report.

Aspect 4: The method of any of aspects 1 through 3, wherein the generating the CSI report and the BSR comprises determining that a size of the MO UL data is greater than a maximum payload size of the random-access message based on the random-access procedure being a two-step random access procedure or a four-step random access procedure.

Aspect 5: The method of any of aspects 1 through 4, The method of claim 1, wherein the generating the buffer status report comprises determining that a size of the MO UL data is greater than a maximum payload size of the random-access message transmitted on a physical uplink shared channel (PUSCH); and the maximum payload size is determined by a plurality of criteria configured by the wireless communication network for a supported scheduled entity type or a supported scheduled entity capability.

Aspect 6: The method of any of aspects 1 through 5, wherein the generating the CSI report and the BSR comprises determining that MO UL data can be segmented.

Aspect 7: The method of any of aspects 1 through 6, wherein the transmitting the MO UL data to the scheduling entity comprises transmitting segmented MO data.

Aspect 8: The method of any of aspects 1 through 7, further comprising multiplexing a refined CSI or channel quality indicator (CQI) report with the segmented MO data.

Aspect 9: The method of any of aspects 1 through 8, wherein the transmitting the CSI report and the BSR to the scheduling entity further comprises transmitting a request for the scheduled entity to remain in the power saving mode.

Aspect 10: The method of any of aspects 1 through 9, wherein the transmitting the MO UL data to the scheduling entity comprises transmitting the MO UL data on a physical uplink shared channel (PUSCH) assigned to a supported scheduled entity type or a supported scheduled entity capability.

Aspect 11: The method of any of aspects 1 through 10, wherein the power saving mode comprises one of a radio resource control (RRC) idle state, an RRC inactive state or a discontinuous reception (CDRX) mode of an RRC connected state.

Aspect 12: A method of wireless communication of a base station (BS) in a wireless communication network, the method comprising: receiving a channel state information report and a buffer status report in a random-access message from a user equipment (UE) operating in a power saving mode; receiving a request from the UE to remain in the power saving mode; transmitting an uplink grant in a random-access response message in response to receiving the random-access message including the channel state information report and the buffer status report; transmitting an acknowledgement multiplexed with an uplink grant in downlink control information (DCI) or in the random-access response message to allow the UE to remain in the power saving mode; transmitting a channel state information (CSI) request for a refined or compressed CSI report in the DCI or in the random-access response message; and receiving mobile originated (MO) data in response to transmitting the uplink grant.

Aspect 13: The method of aspect 12, wherein the power saving mode comprises one of a radio resource control (RRC) idle state, or a RRC inactive state, or a discontinuous reception (CDRX) mode of RRC connected state.

Aspect 14: The method of aspects 12 or 13, wherein the channel state information report data comprises a synchronization signal block (SSB)-based reference signal received power (RSRP).

Aspect 15: The method of any of aspects 12 through 14, wherein the buffer status report comprises an indication that a buffer of the UE can be segmented.

Aspect 16: The method of any of aspects 12 through 15, wherein the receiving the MO data comprises receiving a refined channel state information report multiplexed with segmented portions of the MO data.

Aspect 17: The method of any of aspects 12 through 16, wherein the receiving the UE data comprises receiving the UE data on a physical uplink shared channel (PUSCH).

Aspect 18: The method of any of aspects 12 through 17, wherein the power saving mode comprises one of an idle radio resource control (RRC) state or an inactive RRC state, and wherein the buffer status report comprises an indication that a buffer of the UE can be segmented.

Aspect 19: An apparatus within a wireless communication network, comprising a transceiver, a memory, and a processor communicatively coupled to the transceiver and the memory, wherein the processor and the memory are configured to perform a method of any one of aspects 1 through 11, or aspects 12 through 18.

Aspect 20: An apparatus comprising at least one means for performing a method of any one of aspects 1 through 11, or aspects 12 through 18.

Aspect 21: A non-transitory computer-readable medium having stored therein instructions executable by one or more processors of an apparatus in a wireless communication method to perform a method of any one of aspects 1 through 11, or aspects 12 through 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2 and 4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method of wireless communication of a scheduled entity in a wireless communication network, the method comprising:
    initiating a random-access procedure to transmit mobile originated (MO) uplink (UL) data from the scheduled entity in a power saving mode of the scheduled entity;
    generating a channel state information (CSI) report and a buffer status report (BSR);
    transmitting the channel state information report and the buffer status report to a scheduling entity in a random-access message of the random-access procedure;
    receiving a random-access response message from the scheduling entity in response to transmitting the channel state information report and the buffer status report in the random-access message; and
    transmitting the MO UL data to the scheduling entity while remaining in the power saving mode, based on the received random-access response message.

2. The method of claim 1, further comprising receiving configuration information for random access and channel state information (CSI) reporting procedures associated with a scheduled entity type or a scheduled entity capability supported by the wireless communication network.

3. The method of claim 2, wherein the generating the buffer status report comprises determining that a size of the MO UL data is greater than a maximum payload size of the random-access message transmitted on a physical uplink shared channel (PUSCH); and the maximum payload size is determined by a plurality of criteria configured by the wireless communication network for the supported scheduled entity type or the scheduled entity capability.

4. The method of claim 2, wherein the transmitting the MO UL data to the scheduling entity comprises transmitting the MO UL data on a physical uplink shared channel (PUSCH) assigned to the scheduled entity type or the scheduled entity capability.

5. The method of claim 1, wherein the channel state information report comprises one of a synchronization signal block (SSB)-based reference signal received power (RSRP) measurement and an associated SSB beam index, or a refined CSI report and an additional associated beam index of a downlink resource signals (DL RS) utilized to obtain the refined CSI report.

6. The method of claim 1, wherein the generating the CSI report and the BSR comprises determining that a size of the MO UL data is greater than a maximum payload size of the random-access message based on the random-access procedure being a two-step random access procedure or a four-step random access procedure.

7. The method of claim 1, wherein the generating the CSI report and the BSR comprises determining that the MO UL data can be segmented.

8. The method of claim 7, wherein the transmitting the MO UL data to the scheduling entity comprises transmitting segmented MO UL data.

9. The method of claim 8, further comprising multiplexing a refined CSI or channel quality indicator (CQI) report with the segmented MO UL data.

10. The method of claim 1, wherein the transmitting the CSI report and the BSR to the scheduling entity further comprises transmitting a request for the scheduled entity to remain in the power saving mode.

11. A user equipment (UE) within a wireless communication network, comprising:
 a transceiver;
 a memory; and
 a processor communicatively coupled to the transceiver and the memory, wherein the processor and the memory are configured to:
  initiate a random-access procedure to transmit mobile originated (MO) uplink (UL) data from the scheduled entity in a power saving mode of the scheduled entity;
  generate a channel state information (CSI) report and a buffer status report (BSR);
  transmit the channel state information report and the buffer status report to a scheduling entity in a random-access message of the random-access procedure;
  receive a random-access response message from the scheduling entity in response to transmitting the channel state information report and the buffer status report in the random-access message; and
  transmit the MO UL data to the scheduling entity while remaining in the power saving mode, based on the received random-access response message.

12. The UE of claim 11, wherein the power saving mode comprises one of a radio resource control (RRC) idle state, an RRC inactive state or a discontinuous reception (CDRX) mode of an RRC connected state.

13. The UE of claim 11, wherein the channel state information report comprises one of a synchronization signal block (SSB)-based reference signal received power (RSRP) measurement and an associated SSB beam index, or a refined CSI report and an additional associated beam index of a downlink resource signals (DL RS) utilized to obtain the refined CSI report.

14. The UE of claim 11, wherein the processor and the memory are configured to generate the CSI report and the BSR by determining that a size of the MO UL data is greater than a maximum payload size of the random-access message based on the random-access procedure being a two-step random access procedure or a four-step random access procedure.

15. The UE of claim 11, wherein the processor and the memory are configured to generate the buffer status report by determining that a size of the MO UL data is greater than a maximum payload size of the random-access message transmitted on a physical uplink shared channel (PUSCH), and the maximum payload size is determined by a plurality of criteria configured by the wireless communication network for a supported UE type or a supported UE capability.

16. The UE of claim 11, wherein the processor and the memory are configured to generate the CSI report and the BSR by determining that MO UL data can be segmented.

17. The UE of claim 16, wherein the processor and the memory are configured to transmit the MO UL data to the scheduling entity by transmitting segmented MO UL data.

18. The UE of claim 17, wherein the processor and the memory are configured to multiplex a refined CSI or channel quality indicator (CQI) report with the segmented MO UL data.

19. The UE of claim 11, wherein the processor and the memory are configured to transmit the CSI report and the BSR to the scheduling entity by transmitting a request for the scheduled entity to remain in the power saving mode.

20. The UE of claim 11, wherein the processor and the memory are configured to transmit the MO UL data to the scheduling entity by transmitting the MO UL data on a physical uplink shared channel (PUSCH) assigned to a supported scheduled entity type or a supported scheduled entity capability.

21. A method of wireless communication of a base station (BS) in a wireless communication network, the method comprising:
 receiving a channel state information report and a buffer status report in a random-access message from a user equipment (UE) operating in a power saving mode;
 receiving a request from the UE to remain in the power saving mode;
 transmitting an uplink grant in a random-access response message in response to receiving the random-access message including the channel state information report and the buffer status report;
 transmitting an acknowledgement multiplexed with an uplink grant in downlink control information (DCI) or in the random-access response message to allow the UE to remain in the power saving mode; and
 transmitting a channel state information (CSI) request for a refined or compressed CSI report in the DCI or in the random-access response message; and
 receiving mobile originated (MO) data in response to transmitting the uplink grant.

22. The method of claim 21, wherein the power saving mode comprises one of a radio resource control (RRC) idle state, or a RRC inactive state, or a discontinuous reception (CDRX) mode of RRC connected state.

23. The method of claim 21, wherein the channel state information report comprises a synchronization signal block (SSB)-based reference signal received power (RSRP).

24. The method of claim 21, wherein the buffer status report comprises an indication that a buffer of the UE can be segmented.

25. The method of claim 24, wherein the receiving the MO data comprises receiving a refined channel state information report multiplexed with segmented portions of the MO data.

26. The method of claim 21, wherein the receiving the MO data comprises receiving the MO data on a physical uplink shared channel (PUSCH).

27. A base station (BS) within a wireless communication network, comprising:
   a transceiver;
   a memory; and
   a processor communicatively coupled to the transceiver and the memory, wherein the processor and the memory are configured to:
      receive a channel state information report and a buffer status report in a random-access message from a user equipment (UE) operating in a power saving mode;
      receive a request from the UE to remain in the power saving mode;
      transmit an uplink grant in a random-access response message in response to receiving the random-access message including the channel state information report and the buffer status report;
      transmit an acknowledgement multiplexed with an uplink grant in downlink control information (DCI) or in the random-access response message to allow the UE to remain in the power saving mode;
      transmit a channel state information (CSI) request for a refined or compressed CSI report in the DCI or in the random-access response message; and
      receive mobile originated (MO) data in response to transmitting the uplink grant.

28. The BS of claim 27, wherein the power saving mode comprises one of an idle radio resource control (RRC) state or an inactive RRC state, and wherein the buffer status report comprises an indication that a buffer of the UE can be segmented.

29. The BS of claim 27, wherein the channel state information report comprises a synchronization signal block (SSB)-based reference signal received power (RSRP).

30. The BS of claim 27, wherein the processor and the memory are configured to:
   receive a refined channel state information report multiplexed with segmented portions of the MO data, and/or
   receive the MO data on a physical uplink shared channel (PUSCH).

* * * * *